US010785282B2

(12) United States Patent
Lyons et al.

(10) Patent No.: US 10,785,282 B2
(45) Date of Patent: Sep. 22, 2020

(54) LINK FILE SHARING AND SYNCHRONIZATION

(71) Applicant: Dropbox, Inc., San Francisco, CA (US)

(72) Inventors: Mike Lyons, New York, NY (US);
Shachar Binyamin, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 634 days.

(21) Appl. No.: 14/973,352

(22) Filed: Dec. 17, 2015

(65) Prior Publication Data

US 2017/0177194 A1 Jun. 22, 2017

(51) Int. Cl.
*G06F 16/958* (2019.01)
*H04L 29/08* (2006.01)
*G06F 16/955* (2019.01)

(52) U.S. Cl.
CPC ............ *H04L 67/06* (2013.01); *G06F 16/958* (2019.01); *G06F 16/9558* (2019.01); *H04L 67/02* (2013.01)

(58) Field of Classification Search
CPC ........... G06F 17/30882; G06F 17/3089; H04L 67/02; H04L 67/06; H04L 67/42
See application file for complete search history.

(56) References Cited

U.S. PATENT DOCUMENTS

| 8,533,199 | B2 | 9/2013 | Malla | |
| 8,650,283 | B1* | 2/2014 | Chang | H04N 21/25875 709/224 |
| 2003/0097597 | A1* | 5/2003 | Lewis | H04L 63/083 726/7 |
| 2003/0140118 | A1* | 7/2003 | Alexander Lloyd | G06F 17/3089 709/218 |
| 2011/0191231 | A1* | 8/2011 | Zuver, Jr. | G06Q 40/04 705/37 |
| 2012/0158668 | A1* | 6/2012 | Tu | G06Q 10/101 707/687 |
| 2013/0067594 | A1* | 3/2013 | Kantor | G06F 21/6218 726/28 |
| 2013/0254897 | A1* | 9/2013 | Reedy | G06F 21/10 726/26 |
| 2013/0332443 | A1* | 12/2013 | Opalinski | G06F 17/30864 707/709 |
| 2013/0333026 | A1* | 12/2013 | Starink | H04L 63/0281 726/22 |
| 2014/0165176 | A1* | 6/2014 | Ow | H04L 63/10 726/8 |

(Continued)

*Primary Examiner* — Mark D Featherstone
*Assistant Examiner* — Navneet Gmahl
(74) *Attorney, Agent, or Firm* — Polsinelli PC

(57) ABSTRACT

A content management system can receive, from a client device, a link including an address to a network resource. The content management system can then store a link file including the link, and provide the link file on a first page of a website. Next, in response to an input received from a browser application at the client device, the content management system can extract the address from the link file and provide a second page on the website displaying the address from the link file and a graphical element configured to receive a request from the browser application to navigate to the address. In response to receiving the request from the browser application, the content management system can then instruct the browser application to navigate to the address.

18 Claims, 12 Drawing Sheets

(56) References Cited

U.S. PATENT DOCUMENTS

| | | |
|---|---|---|
| 2014/0172925 A1 | 6/2014 | Goldbrenner et al. |
| 2014/0208220 A1 | 7/2014 | Watal |
| 2014/0222877 A1 | 8/2014 | Lin et al. |
| 2014/0237347 A1 | 8/2014 | Jeyachandran |
| 2015/0288701 A1* | 10/2015 | Brand .................. H04L 63/102 726/7 |
| 2016/0149956 A1* | 5/2016 | Birnbaum ............. H04L 63/101 726/1 |
| 2016/0234267 A1* | 8/2016 | Hebbar ................. H04L 65/403 |
| 2017/0083534 A1* | 3/2017 | Strong ................... H04L 63/12 |

* cited by examiner

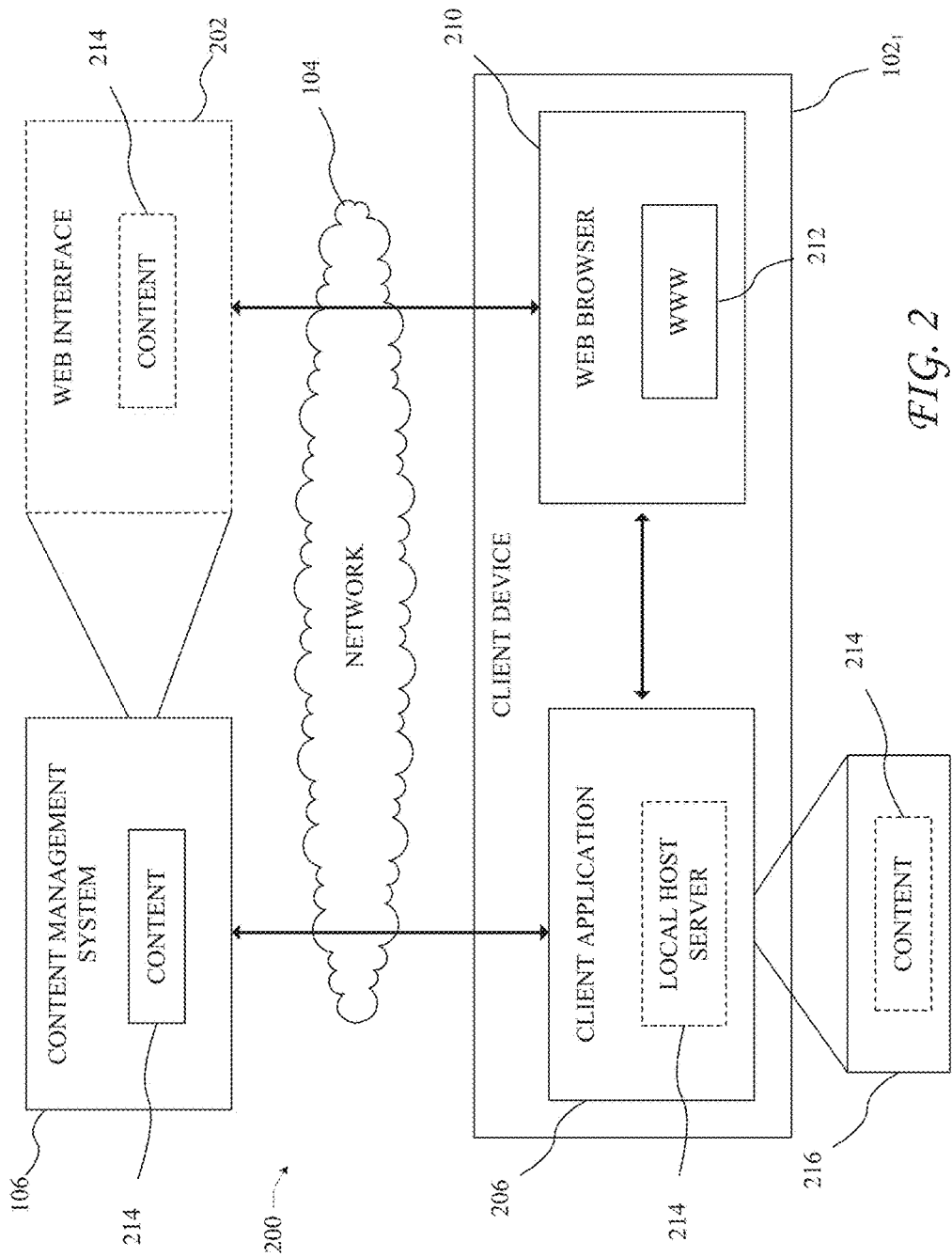

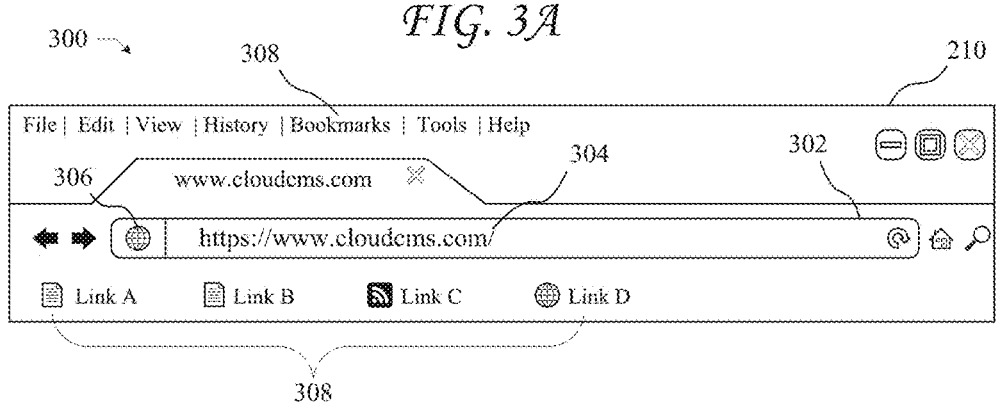
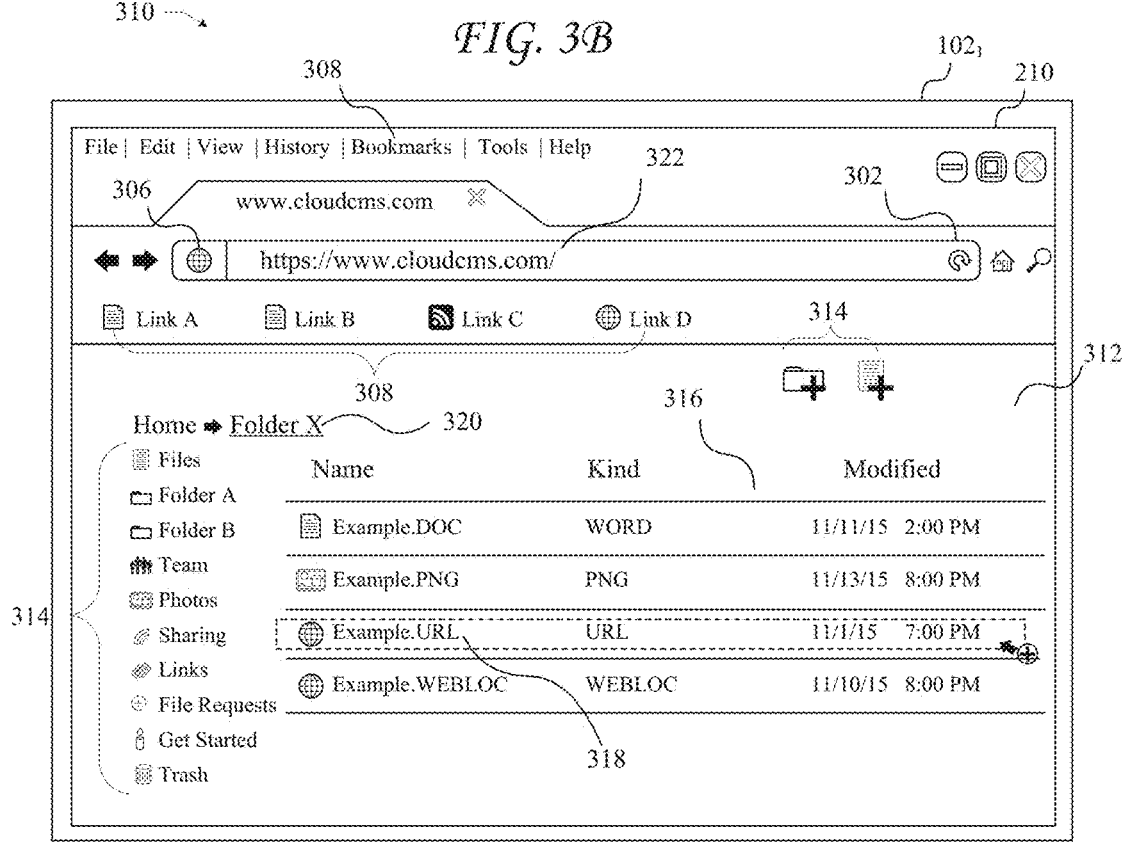

[InternetShortcut]
URL=http://www.someaddress.com/
WorkingDirectory=C:\Windows\
ShowCommand=7
IconIndex=1
IconFile=C:\Windows\SYSTEM\url.dll
Modified=20F06BA06
Hotkey=1601

```
<?xml version="1.0" encoding="UTF-8"?>
<!DOCTYPE plist PUBLIC "-//Apple//DTD PLIST 1.0//EN"
"http://www.apple.com/DTDs/PropertyList-1.0.dtd">
<plist version="1.0>
<dict>
    <key> URL</key>
    <string>http://www.someaddress.com/</string>
</dict>
</plist>
```

822

824

LINK FILE SHARING AND SYNCHRONIZATION

TECHNICAL FIELD

The present technology pertains to a content management system, and more specifically pertains to a content management system for online storing, sharing, and synchronization of link files.

BACKGROUND

Today, users typically utilize a wide variety of software applications, including local and online applications, to complete various tasks in their personal and professional lives. The various applications are typically configured to store user content at different, respective locations. As a result, the user's content items are often scattered throughout different locations and applications. Not surprisingly, users frequently struggle to find specific information from their scattered content.

In addition, users generally use different network and online resources to collect and access information. For example, users frequently go to different web pages to review and gather information. Such resources are accessible from specific links or addresses, such as uniform resource locators (URLs). Users need these links or addresses to access the resources. Accordingly, users often maintain a growing number of links and addresses to resources for future use. By maintaining links to specific resources, users can revisit those resources and refer to content when needed. This can be very helpful, as it is common for a user to refer to a resource, such as a web page, multiple times.

To store specific links and addresses of interest, users typically bookmark the corresponding URLs using their web browser's bookmark feature or collect the URLs with an application specifically designed to store URLs. Unfortunately, in collecting or bookmarking URLs, these tools separate the URLs from other user content, including user content items from other applications. In turn, the user's various content items and URLs can become significantly fragmented and distributed across numerous applications and locations.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for online storing, sharing, and synchronization of link files through a content management system. Users can upload links, such as URLs, to a content management system. The users can upload the links to the content management system from a browser application or a client-side application (e.g., desktop application, mobile application, native application) associated with the content management system. For example, users can drag and drop URLs from their web browser into a folder hosted by the content management system. Moreover, the users can upload the links to specific location or folder on the content management system. The specific location or folder can be a public space or a space designated for a registered user account. Further, the specific location or folder can store various types of web pages or link files, such as Internet shortcut or URL files, WEBSITE files, and website location (WEBLOC) files. The specific location or folder can also store other types of content items, such as images, audio files, videos, text files, etc. For example, the specific location or folder can store portable document format (PDF) files containing previous of content, such as web page previews. Thus, users can maintain bookmarks, web pages, and other data items in a central location.

Users can access uploaded links from any device, through a browser application or a client-side application. Users can also share uploaded links with other users. For example, users can share a specific folder with uploaded links with one or more users. The users can access the uploaded links from the specific folder, or click on the uploaded links to access associated resources and locations. For example, the users can click on a specific link file to re-direct their web browser to the specific address on the link file. Users can also preview the linked content of an uploaded link file prior to navigating to the linked content. For example, users can click on the link file to preview the linked content without navigating to the linked content or address. If the user subsequently wants to navigate to the linked address, the user can opt to continue to the linked address to access the linked content, after previewing the linked content.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 shows a block diagram of an example environment for implementing various embodiments of the present technology;

FIG. 3A shows an example browser toolbar for uploading links to a content management system;

FIG. 3B shows an example web interface for uploading and opening links from a browser application;

FIGS. 8A and 8B show example formats of link files;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for seamless processing, storage, and synchronization of linked files and content through a centralized, online content management system. The approaches set forth herein enable users to upload links, such as URLs, to an online content management system, and access the links from any client device associated with a user account maintained by the content management system. Users can upload links to the content management system from a browser application or a client-side application associated with the content management system. Moreover, users can upload link files of any format, from any browser application or operating system (OS), to the content management system. Users can drag and drop link files from an address bar, toolbar or bookmark folder on a web browser. Further, users can maintain link files along with other types of files, such as images or document files, in a centralized location accessible from different client devices.

The content management system can parse and decode link files of any format, to extract address and content information from uploaded link files. The content management system can use the extracted address and content information to generate prompts and link previews for users. For example, the content management system can use the extracted address and content information to display link information, provide a preview to linked content, generate controls for allowing users to navigate to the linked address, etc.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

Figure 1:
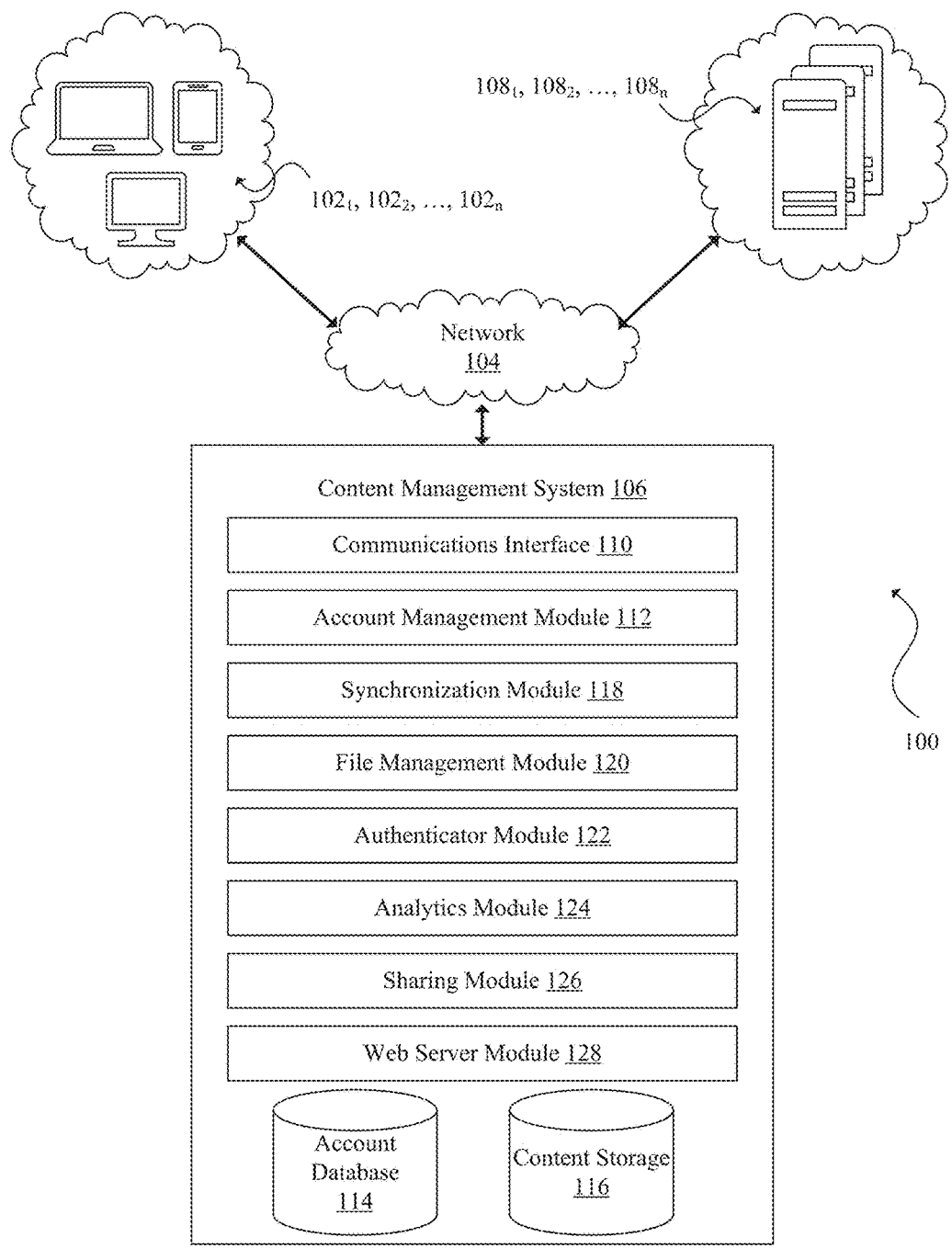
FIG. 1 shows an exemplary configuration of devices and a network for implementing various embodiments of the present technology.

With respect to implementing various embodiments of the disclosed technology, an example system configuration 100 is shown in FIG. 1, where electronic devices communicate via a network for purposes of exchanging content and other data. The system can operate in a wide area network (WAN), such as the Internet. However, the present principles are applicable to a wide variety of network configurations that facilitate the intercommunication of electronic devices. For example, each of the components of system 100 in FIG. 1 can be implemented in a localized or distributed fashion in a private network, and public network, or both.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

Content management system 106 can include one or more servers or devices. For example, content management system 106 can include a server or a cluster of servers and/or storage devices, for example. Each server within content management system 106 can include one or more modules (e.g., 110-128). For example, content management system 106 can include modules 110-128 in a single server and/or multiple servers.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 114. User account database 114 can store profile information for registered users. In some cases, the only personal information in the user profile can be a username and/or email address. However, content management system 106 can also be configured to accept additional user information.

User account database 114 can also include account management information, such as account type, e.g. free or paid; usage information, e.g. file edit history; maximum storage space authorized; storage space used; content storage locations; security settings; personal configuration settings; content sharing data; etc. Account management module 112 can be configured to update and/or obtain user account details in user account database 114. The account management module 112 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 116. Content storage 116 can be a storage device, multiple storage devices, or a server. Alternatively, content storage 116 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 116 can store content items using one or more partition types, such as FAT, FAT32, NTFS, EXT2, EXT3, EXT4, ReiserFS, BTRFS, and so forth.

Content storage 116 can also store metadata describing content items, content item types, and the relationship of content items to various accounts, folders, or groups. The metadata for a content item can be stored as part of the content item or can be stored separately. In one variation, each content item stored in content storage 116 can be assigned a system-wide unique identifier.

Content storage 116 can decrease the amount of storage space required by identifying duplicate files or duplicate segments of files. Instead of storing multiple copies, content storage 116 can store a single copy and then use a pointer or other mechanism to link the duplicates to the single copy. Similarly, content storage 116 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 118 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

Content management system 106 can manage content items as blocks of data with a fixed size. When a new content item is added to client device $102_i$, client device $102_i$ can transmit the new content item as blocks and a blocklist to content management system 106. Content management system 106 can use the blocklist to determine the blocks expected to be received at content management system 106, and client device $102_i$ may begin transmitting the blocks of the new content item to content management system 106. When the blocks received at content management system 106 match expected blocks, content management system 106 can notify receiving clients to begin receiving the blocks for the new content item, prior to receipt of all the blocks on the blocklist at content management system 106. This may enable synchronization of content items across client devices 102 prior to actual entry of the new content item into content management system 106.

A user can also view or manipulate content via a web interface generated and served by web server module 128. For example, the user can navigate in a web browser to a web address provided by content management system 106. Changes or updates to content in the content storage 116 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 110 for interfacing with various client devices 102, and can interact with other content and/or service providers $108_1, 108_2, \ldots, 108_n$ (collectively "108") via an Application Programming Interface (API). Certain software applications can access content storage 116 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 116 through a web site.

Content management system 106 can also include authenticator module 122, which can verify user credentials, security tokens, API calls, specific client devices, and so forth, to ensure only authorized clients and users can access files.

Further, content management system 106 can include analytics module 124 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 126 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 116. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 116. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 126 can be configured to add a user account identifier to the content entry associated with the content item, thus granting the added user account access to the content item. Sharing module 126 can also be configured to remove user account identifiers from a content entry to restrict a user account's access to the content item.

To share content publicly, sharing module 126 can be configured to generate a custom network address, such as a uniform resource locator (URL), which allows any web browser to access the content in content management system 106 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible.

FIG. 2 shows a block diagram of an example environment 200 for implementing various embodiments of the present technology. Client device 102$_1$ can communicate with content management system 106, via network 104, to perform a login process, access content 214, and/or interact with content management system 106 and web interface 202. Web interface 202 can host a website associated with content management system 106. Web interface 202 can be hosted and managed by server module 128 on content management system 106.

Content management system 106 can maintain content 214 for users to access via client devices 102. Content 214 can include media files (e.g., photos, videos, audio, documents, and the like), links and link files, profiles, webpages, and any other data. For example, content 214 can include webpage content provided by web interface 202, data associated with one or more user accounts registered at content management system 106, user account information (e.g., account details, profiles, account content, etc.), etc.

Client device 102$_1$ can login to content management system 106 using a user account registered with content management system 106, and/or access account content 214 on content management system 106. Content management system 106 can maintain one or more registered user accounts, which can be tied to individual users, clients, members, or subscribers that use services provided by content management system 106. User accounts can include information about respective users' profiles, credentials, synchronized data, membership information, etc. For example, content management system 106 can maintain user profiles (e.g., name, address, email address, phone number, user preferences, etc.), login credentials (e.g., username, password, security questions, cryptographic keys, etc.), synchronized data (e.g., files, folders, documents, links, etc.), membership information (e.g., date joined, membership tier, subscription status, billing information, standing, etc.), device information (e.g., client device identifiers, client device addresses, associated software applications, etc.), and so forth.

Client device $102_1$ can have client application 206 (also called, "client-side application," "desktop application," "mobile application," etc.) installed and running on client device $102_1$. Client application 206 can run on the client device's operating system (OS). For example, if client device $102_1$ runs a WINDOWS® OS, client application 206 can be a WINDOWS® application. In another example, if client device $102_1$ is a mobile smartphone running APPLE® iOS, client application 206 can be an iOS application. Users can download client application 206 from a website (such as a website from web interface 202) or an application marketplace, and install it on client device $102_1$.

Client application 206 can provide an interface for the user of client device $102_1$ to access content 214 on content management system 106, interact with content management system 106, and synchronize content 214 between content management system 106 and client device $102_1$. For example, client application 206 can provide an interface for user(s) at client device $102_1$ to register an account with content management system 106; login with the registered account to content management system 106; create and access content (e.g., content 214) on content management system 106; upload content (e.g., content 214) to, and download content (e.g., content 214) from, content management system 106; synchronize data (e.g., content 214) with content management system 106; etc.

Client application 206 can also provide an interface for users to access and/or modify data and content on client device $102_1$. For example, client device $102_1$ can include content library 216, which can be accessed via client application 206. Content library 216 can include content items from content 214 in content management system 106. Content library 216 can also include other content items, such as files, folders, links, documents, resources, or other electronic data. Client application 206 can interact with content library 216 to add, edit, delete, configure, or manage any portion of content library 216. Client application 206 can thus provide an interface for users to access content library 216 and content 214 on client device $102_1$. Client application 206 can also allow users to synchronize any portion of content library 216 and/or content 214 with content management system 106. Client application 206 can also allow users to view, modify, and delete any portion of content 214 on content management system 106, and/or synchronize any portion of content 214 from client device $102_1$ to content management system 106 and vice versa.

Client application 206 may include local host server 208 (e.g., a local web server). Local host server 208 can be part of client application 206, or can be a separate entity that exists outside client application 206. Local host server 208 can run web server software at client device $102_1$. Accordingly, client application 206 can, for example, host a local website (e.g., www.localhost.com) at client device $102_1$ through local host server 208. Moreover, local host server 208 can generate and/or service dynamic and static web documents to clients and/or applications. In some cases, a local website hosted by local host server 208 can be associated with a network address or domain (e.g., public address and domain name) for access by other devices and/or applications residing on remote devices.

Client device $102_1$ can also have browser application 210 installed and running on it. Browser application 210 allows a user to access web content by fetching and rendering web documents according to various protocols and standards (e.g., web protocols, communication protocols, scripting language standards, content formats, content rendering standards, etc.). Moreover, browser application 210 can navigate and access documents on web interface 202. For example, browser application 210 can access website 212 through web interface 202, and render web pages from website 212 through browser application 210. Website 212 can include content 214 from content management system 106, and any other web content or features. Thus, browser application 210 can access content 214 from content management system 106 through web interface 202.

Browser application 210 may also access local content on client device $102_1$. For example, browser application 210 may access content from content library 216 and/or content associated with client application 206. Browser application 210 can also communicate with client application 206 and/or local host server 208 on client device $102_1$. For example, browser application 210 can establish a local communication channel to client application 206 and/or local host server 208 to exchange communications with client application $102_1$ and/or local host server 208.

FIG. 3A shows an example browser toolbar 300 for uploading links to content management system 106 from browser application 210. Browser toolbar 300 can include a navigation bar 302. Navigation bar 302 displays address 304A of the page being rendered by browser application 210. Address 304 can be a URL, which can include an IP address, a fully qualified domain name (FQDN), etc. The user can also prompt browser application 210 to navigate to a different page by entering a corresponding address on navigation bar 302.

Navigation bar 302 can also include icon 306 of address 304A. Icon 306 can be an image, thumbnail, or graphical element representing address 304A. Icon 306 can also include a reference to address 304A, such as a link or hyperlink. Thus, icon 306 can be configured to point to address 304A such that a user trigger browser application 210 to navigate to address 304A by interacting with icon 306. For example, a user can navigate to address 304A by selecting, clicking, or hovering icon 306.

Browser toolbar 300 can also include bookmarks 308. Bookmarks 308 can be added to interface 300 by a user from browser application 210. Bookmarks 308 can include respective links to resources, such as web pages.

Users can upload links from browser toolbar 300 to content management system 106 in various ways. For example, users can upload address 304A to content management system 106 from navigation bar 302, icon 304A, or bookmarks 308. To illustrate, users can upload address 304A to content management system 106 by copying or dragging address 304A from navigation bar 302 to a destination, such as a folder or website, associated with content management system 106. Users can also upload address 304A to content management system 106 by copying or dragging icon 306A from navigation bar 302 to the destination associated with content management system 106. Users can also upload address 304A to content management system 106 by copying or dragging a respective bookmark from bookmarks 308 to the destination associated with content management system 106.

Users can also upload any other address to content management system 106 by copying or dragging the address from navigation bar 302, copying or dragging the respective icon from navigation bar 302, copying or dragging a respective bookmark from bookmarks 308, or copying or dragging a local link file (e.g., an Internet shortcut or WEBLOC file).

FIG. 3B shows an example web interface 310 for uploading links from browser application 210 to content management system 106. Browser application 210 can navigate to web page 312 and present web page 312 on web interface 310. For example, browser application 210 can include navigation bar 302 for navigating Internet content. Browser application 210 can thus navigate to web page 312 by entering address 322 on navigation bar 302. Browser application 210 can otherwise navigate to web page 312 by clicking on a link or receiving a command that directs browser application 210 to address 322.

Web page 312 can be part of a website associated with content management system 106. For example, web page 312 can present content stored on, and features provided by, content management system 106. The content and features provided on web page 312 can available to authorized users, such as users authenticated via a user account registered with content management system 106. For example, web page 312 can display content maintained by content management system 106 for one or more specific user accounts on content management system 106. Thus, to access web page 312, the user at browser application 210 can perform an authentication process with content management system 106 to authenticate (e.g., login) a user account registered with content management system 106. However, depending on access permissions, alternatively, a user may be able to navigate to web page 312 without authenticating or logging in.

Web page 312 can include menu 314 where the user can select a feature, such as a command or navigation link, from a variety of available options (e.g., "Files," "Folders," "Photos," "Sharing," "Links," "Create new folder," "Create new document," "Delete file," etc.). Web page 312 can also feature content display area 316, where the user can access various files and/or folders (e.g., "Folder A," "File A," "File B," etc.).

Content display area 316 can include various types of files and folders, such as archives, compressed folders, image files, video files, text files, audio files, and/or any other type of folder or data file. The content in content display area 316 can include items contained in folder 320. Folder 320 can be a folder hosted on content management system 106 and accessible via web page 312. Folder 320 can be listed or identified on web page 312 to allow the user know which folder web page 312 is displaying. Folder 320 can also be listed with an indication of the location of folder 312 relative to other folders or web pages, such as a home screen or a root folder. The location of folder 312 can be displayed according to a specific hierarchy or directory structure of the user's content on the website hosting web page 312 and/or content management system 106.

The user can remove selected items in content display area 316 from browser application 210. The user can also add or upload (e.g., copy and paste, drag and drop, browse and attach, etc.) links or link files, and any other type of content item, to content display area 316 from browser application 210. To illustrate, referring to FIGS. 3A and 3B, a user can upload address 304 from navigation bar 302 or a bookmark from bookmarks 308 to content display area 316.

For example, a user can upload address 304 or icon 306, which includes address 304, from navigation bar 302 to content display area 316. As another example, the user can upload a bookmark from bookmarks 308 to content display area 316. When the user uploads an address, link, or bookmark, content display area 316 can then display link file 318 corresponding to the uploaded address, link, or bookmark.

The user can also add or upload links or link files to content display area 316 from a native OS file system, such as client application 206. For example, the user can upload a link file from client application 206 to a folder on client device $102_1$ corresponding to content display area 316, such as a folder containing content items to be presented on, or synchronized with, content display area 316. Client application 206 can then upload the link file to content management system 106 by, for example, synchronizing the content items between the specific folder on client device $102_1$ and a corresponding folder on content management system 106.

Figure 3C:
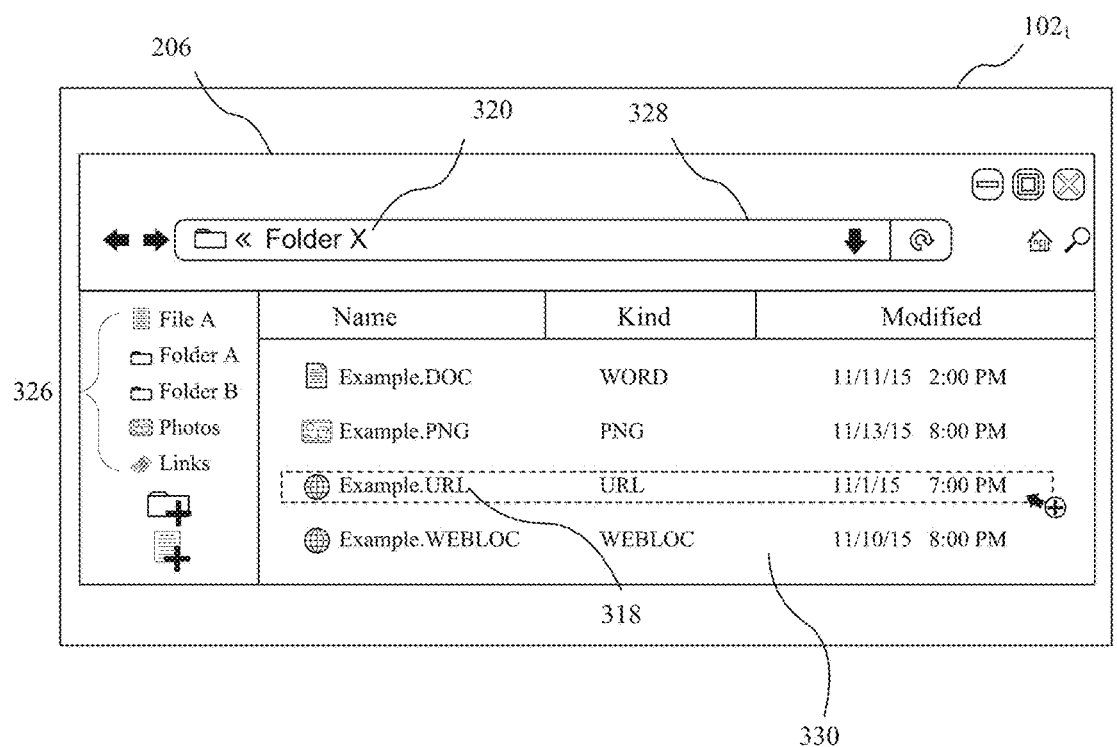
FIG. 3C shows an example interface for uploading and opening links from a client application.

To illustrate, referring to FIG. 3C, client application 206 can provide an interface 324 for uploading content to folder 320 and to be included on content display area 316. Interface 324 can feature menu items 326 for navigating to different folders from client application 206. Interface 324 can also include navigation bar 328 for navigating a directory structure of folders. The user can navigate to folder 320 associated with web page 312 through navigation bar 328 or menu items 326.

When the user navigates to folder 320 from client application 206, interface 324 can access the content associated with folder 320. Content display area 330 on interface 324 can then present the content associated with folder 320. Thus, content display area 330 on interface 324 can include the content items in content display area 316 on web page 312, when the user navigates to folder 320.

The user can add files or folders to content display area 330. The user can add any type of link files to content display area 330. For example, the user can copy or upload a link file from client device $102_1$ to content display area 330. In some cases, the link file added to content display area 330 can be obtained from browser application 210. For example, the user can copy or drag and drop an address from browser application 210 (e.g., address 304 in navigation bar 302, icon 306 in navigation bar 302, a bookmark from bookmarks 308, etc.) to content display area 330.

Content items, such as link files, added to content display area 330 can be uploaded to content management system 106 and presented on content display area 316 on web page 312. For example, content items added to content display area 330 can be synchronized with folder 320 on content management system 106. Thus, when a user navigates to folder 320 (e.g., via web page 312 or interface 324), the content added to content display area 330 will be included in folder 320 (e.g., via content display area 316 or content display area 330).

Content management system 106 can support links and link files received from browser application 210 and client application 206 (e.g., uploaded via content display areas 312 and 330) in any format. For example, content management system 106 can store, decode, read, parse, and manipulate link files in any format. Moreover, web interface 202 can provide web pages displaying link files in any format (e.g., web page 310).

Moreover, link files can include web page files, web page shortcuts, URLs, or any file containing a reference to a network or Internet address, such as a URL. In addition, link files can be stored according to various formats. For example, a link or link file can be stored as an Internet shortcut or URL file (i.e., .URL), a WEBLOC file (i.e., .WEBLOC), a WEBSITE file (i.e., .WEBSITE), etc. The format of the link files can depend on the specific browser application and/or OS used by the client devices 102 when uploading the link files. For example, some browser applications and/or OSs may upload links as URL or WEBSITE files, while other browser applications and/or OSs may upload links as WEBLOC FILES.

In some configurations, link files can include some or all of the content from an uploaded address or link. For example, a link file to a web page can include the content from the web page. Here, the web page can be exported or saved to a separate file, such as a PDF (portable document format) file, and the separate file can be stored as a link file associated with that web page.

Figure 4:
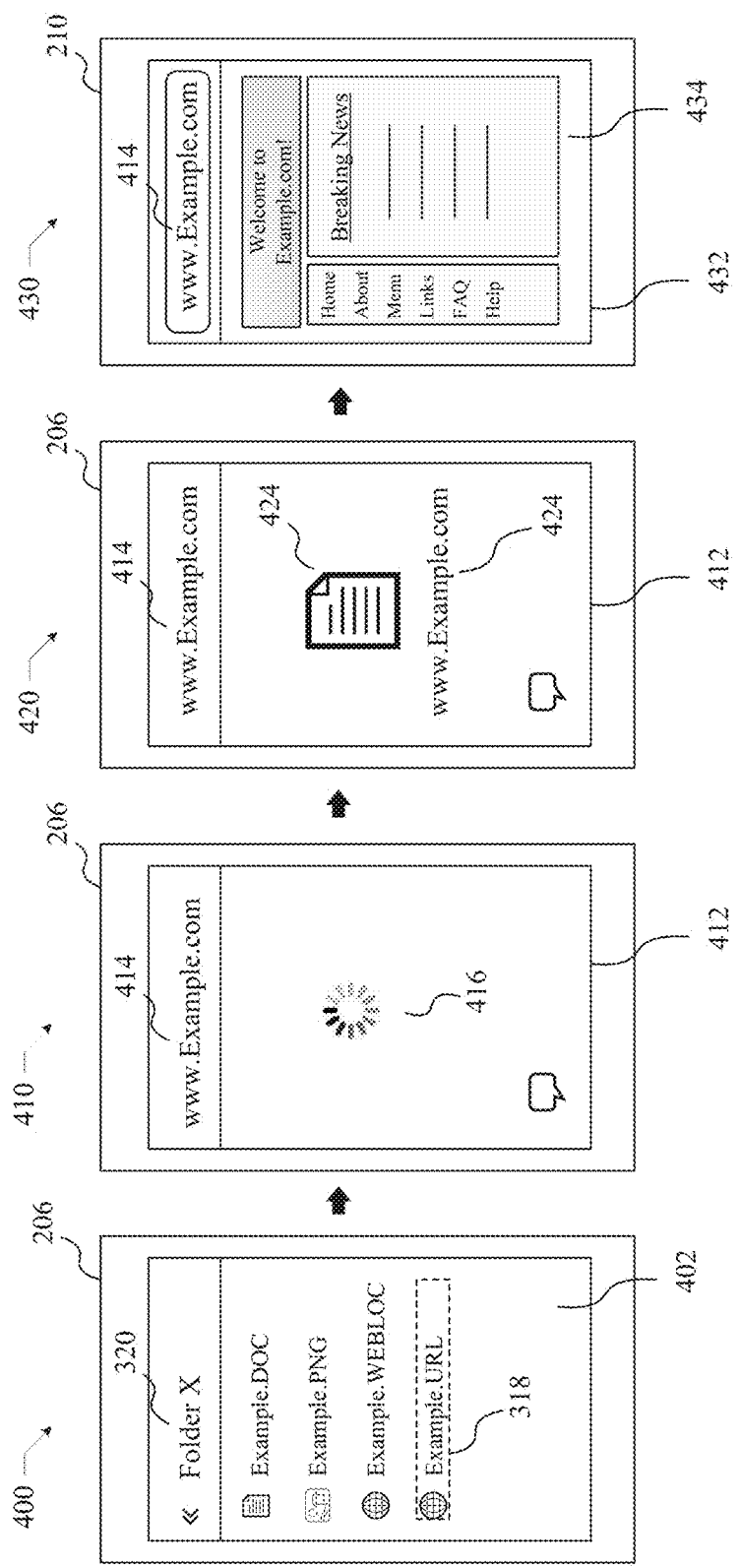
FIG. 4 shows a schematic diagram of example interfaces for opening uploaded links from a client application, in accordance with various embodiments.

FIG. 4 shows a schematic diagram of example interfaces 400, 410, 420, 430 for navigating uploaded links from client application 206, in accordance with various embodiments. A user can access content items 402 from interface 400 via client application 206. Content items 402 can include one or more link files stored in folder 320 on content management system 106. Content items 402 can also include any other type of file or folder stored in folder 320.

The user can select a link file from content items 402 to preview, and/or navigate to, an address referenced in the selected link file. For example, the user can select link file 318 to preview, and/or navigate to, address 414 referenced in link file 318. When the user selects link file 318, client application 206 can trigger interfaces 410, 420, and/or 430, providing access to content associated with address 414.

At interface 410, client application 206 can show file previewer 412 indicating that content associated with link file 318 is being loaded. File previewer 412 can include progress status information 416, such as a progress bar, to indicate the progress of content being loaded.

At interface 420, client application 206 can display file previewer 412 loaded with preview content 424. Preview content 424 can display address 414 to indicate the link destination of link file 318. Preview content 424 can also include a preview of the content or resource at address 414. For example, preview content 424 can include a thumbnail image, a portable document format (PDF), or other information of a web page or resource at address 414. Moreover, preview content 424 can include metadata about address 414 (e.g., title, domain, resource type, author, restrictions, format, technical requirements, etc.) and/or any other information about address 414, such as status information (e.g., security status, health status of link, etc.).

At interface 430, browser application 210 can then present page 432 with content 434. Page 432 can be a page or resource located at address 414. Moreover, content 434 can include any content from address 414. For example, page 432 can be a web page located at address 414, and content 434 can include any web page content associated with page 432.

In some configurations, browser application 210 can present interface 430 automatically after the user selects link file 318 from interface 400 on client application 206. Here, client application 206 can trigger browser application 210 to launch and load page 432 with content 434 when the user selects link file 318. Browser application 210 can load page 432 as a separate window or tab within browser application 210.

In other configurations, browser application 210 can present interface 430 after client application 206 presents interface 420. For example, client application 206 can trigger browser application 210 to present interface 430 when a user selects preview content 424 on interface 420 or after a period of time has lapsed since client application 206 loaded interface 420.

Figure 5:
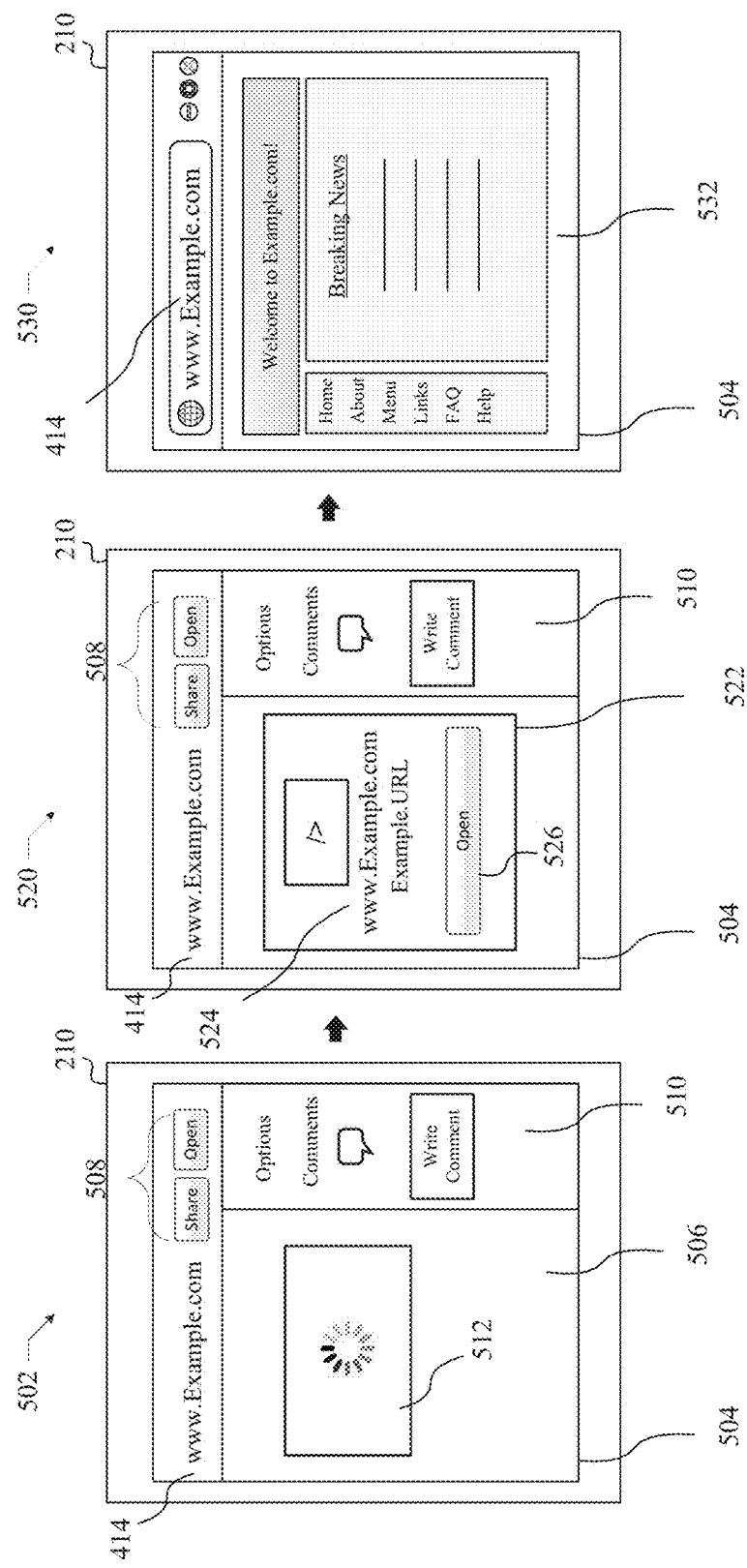
FIG. 5 shows a schematic diagram of example browser screens for navigating uploaded links from a browser application.

FIG. 5 shows a schematic diagram of example browser screens 502, 520, 530 for navigating uploaded links from browser application 210, in accordance with various embodiments. When a user selects a link file (e.g., link file 318) associated with address 414, browser application 210 can load page 504 for navigating and/or previewing content associated with address 414. The user can select the link file as previously described with reference to FIGS. 3B, 3C, and 4.

At screen 502, page 504 can include address 414 and control features 508 for sharing or opening address 414. Page 504 can also include comments section 510 for viewing and submitting user comments. Moreover, page 504 can include content section 506, which can display progress status information 512.

As browser application 210 loads screen 502, content management system 106 can fetch content from address 414 for previewing by the user at screen 520. At screen 520, page 504 can then load preview section 522 displaying a preview of any of the fetched content. Preview section 522 can display preview portion 524 and control element 526. Preview portion 524 can display preview information for address 414. The preview information can include metadata (e.g., content title, content type, content location, domain, etc.), address information (e.g., URL, domain name, protocol, etc.), link file information (e.g., link file name, link file format, link file location, etc.), one or more images (e.g., a thumbnail of content located at address 414, an icon associated with address 414, etc.), and/or any other data associated with address 414.

Control element 526 can allow a user to trigger browser application 210 to load screen 530. For example, control element 526 can be configured to allow a user to submit a request to load screen 530 displaying content located at address 414. Control element 526 can be configured to trigger browser application 210 to load screen 530 as a new window or tab. Control element 526 can allow the user to select to load screen 530 as a new or current tab or window. Control element 526 can also allow the user to select a specific browser application to load screen 530 if, for example, client device $102_1$ has multiple browser applications installed.

In some configurations, preview section 522 can include multiple control elements. For example, preview section 522 can display control element 526 and one or more additional control elements. The various control elements can allow a user to select between loading screen 530 as a new tab or window, request to cancel the loading of screen 530, etc.

Content management system 106 can validate address 414 before browser application 210 navigates to screen 530. In some cases, content management system 106 can validate address 414 before (or while) screen 520 is loaded by browser application 210. In other cases, content management system 106 can validate address 414 in response to a user selection of control element 526. Content management system 106 can also validate address 414 when it is uploaded to content management system 106. For example, if a user tries to upload address 414 to content management system 106, content management system 106 can perform a validation of the address and discard address 414 if it is determined to be invalid.

If content management system 106 determines that address 414 is not valid (e.g., link is broken, page or resource is unavailable, etc.), it can generate a notification to browser application 210 indicating that address 414 is not valid.

At screen 530, browser application 210 can load content 532 from address 414. Content 532 can include a resource, such as a web page or document, located at address 414. Browser application 210 can request and receive content 532 from a server or device hosting content 532 at address 414, and render view 530 with content 532 on page 504. In some configurations, browser application 210 can render view 530 with content 532 on a separate window or tab from screen 502 and/or 520. For example, browser application 210 can render view 530 with content 532 on a new tab or window based on a request from the user received via control element 526.

Browser application 210 can load screen 530 in response to a user selection of control element 526. However, browser application 210 can also load screen 530 in response to a different trigger or threshold. For example, browser application 210 can load screen 530 after a period of time has lapsed since screen 520 was loaded. Moreover, browser application 210 can load screen 530 based on a script, command, or instruction from content management system 106.

Figure 6:
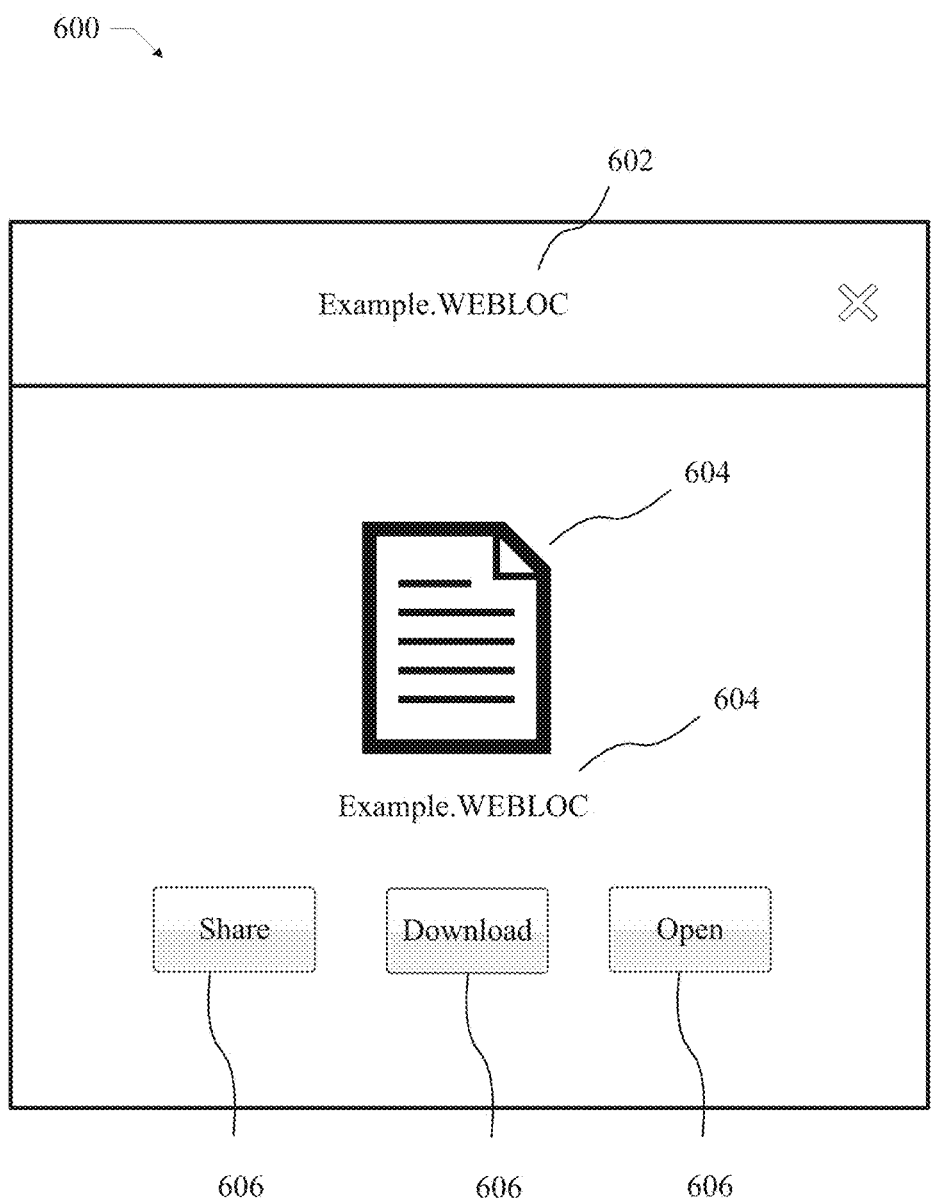
FIG. 6 shows an example dialog for interacting with a link file.

FIG. 6 shows an example dialog 600 for interacting with a link file. Dialog 600 can be presented via an interface on client device $102_1$ (e.g., browser application 210, client application 206, etc.) in response to a user interaction with a link file (e.g., user selection). Dialog 600 can display filename 602, preview content 604, and control elements 606.

Filename 602 can include the name and/or extension of the link file associated with dialog 600. Filename 602 can also present an address associated with the link file, such as a URL. Preview content 604 can display the name and/or extension of the link file and a preview, such as a thumbnail or icon, of the address associated with the link. In some cases, preview content 604 can include a PDF or other document of a web page or resource located at the address associated with the link file. Preview content 604 can also present other information and/or metadata associated with the address, such as a link or domain, for example.

Control elements 606 can allow the user to interact with dialog 600. For example, control elements 606 can be configured to allow a user to share, download, or open a link or address associated with the link file.

Figure 7:
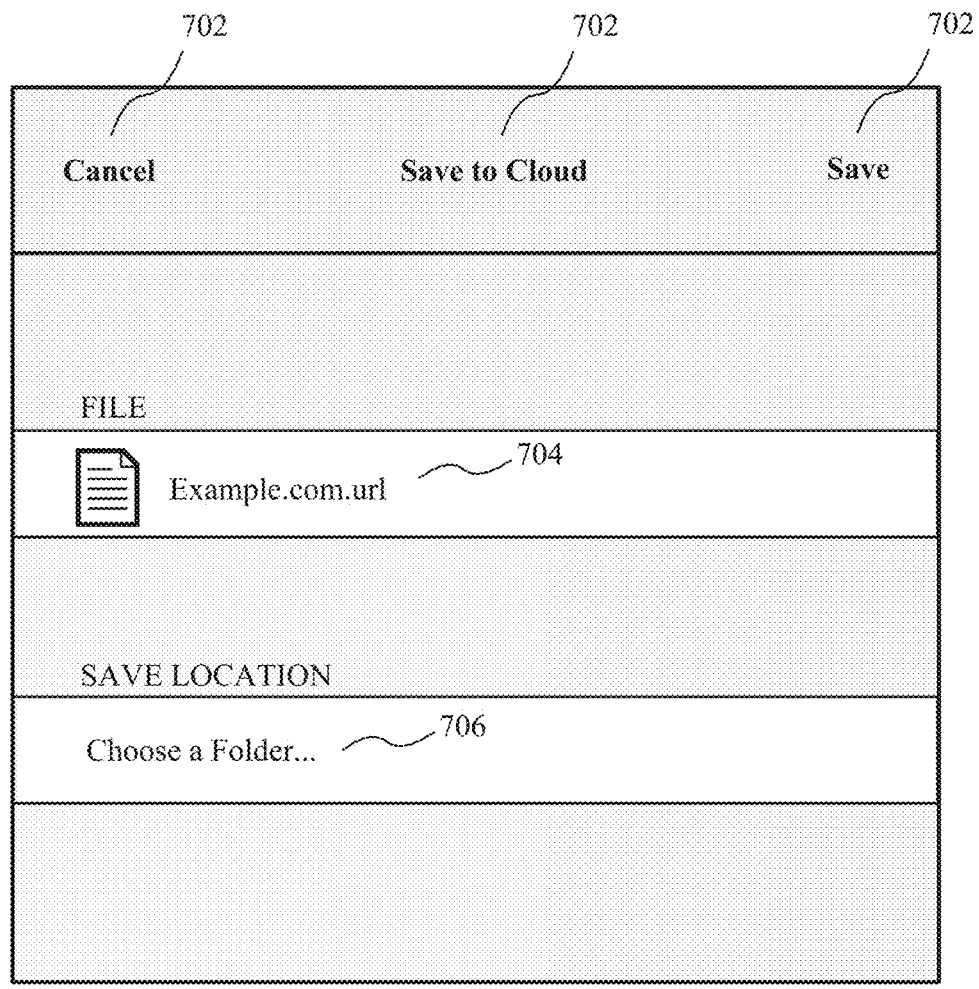
FIG. 7 shows an example interface for saving a selected link file to a content management system.

FIG. 7 shows an example interface 700 for saving a selected link file to content management system 106. Interface 700 can display a name 704 of the selected link file to be saved. Name 704 can include the name and extension of the selected link file. Interface 700 can also include destination selection menu 706 for selecting a specific location or folder to save the selected link file. Destination selection menu 706 can allow a user to enter an address, such as a folder path or network address, navigate to a specific location or folder, and/or select a destination folder.

Interface 700 can also include control elements 702. Control elements 702 can include control elements for canceling the save operation, saving to a current location, saving to a specified location or space (e.g., saving to the cloud or content management system, saving to a space associated with a user account, etc.), selecting a different link file, adding additional items, and so forth.

FIGS. 8A and 8B show example formats of link files. Referring to FIG. 8A, format 800 includes non-limiting, example fields 802 for a URL or WEBSITE file. Fields 802 can include an address field 804. The value of address field 804 can represent a link, such as a URL, referenced by the link file. The link in address field 804 is the address location of the content or resource (e.g., page) to load. The link in address field 804 is shown as an HTTP link. However, the link is not restricted to the HTTP protocol, and can instead include other protocols.

Referring to FIG. 8B, format 820 includes non-limiting, example fields 822 for a WEBLOC file. Fields 822 can include an address key and string 824. Address key and string 824 can represent a link, such as a URL, referenced by the link file. The link is the address location of the content or resource (e.g., page) to load. The link in address key and string 824 is shown as an HTTP link. However, the link is not restricted to the HTTP protocol, and can instead include other protocols.

Figure 9A:
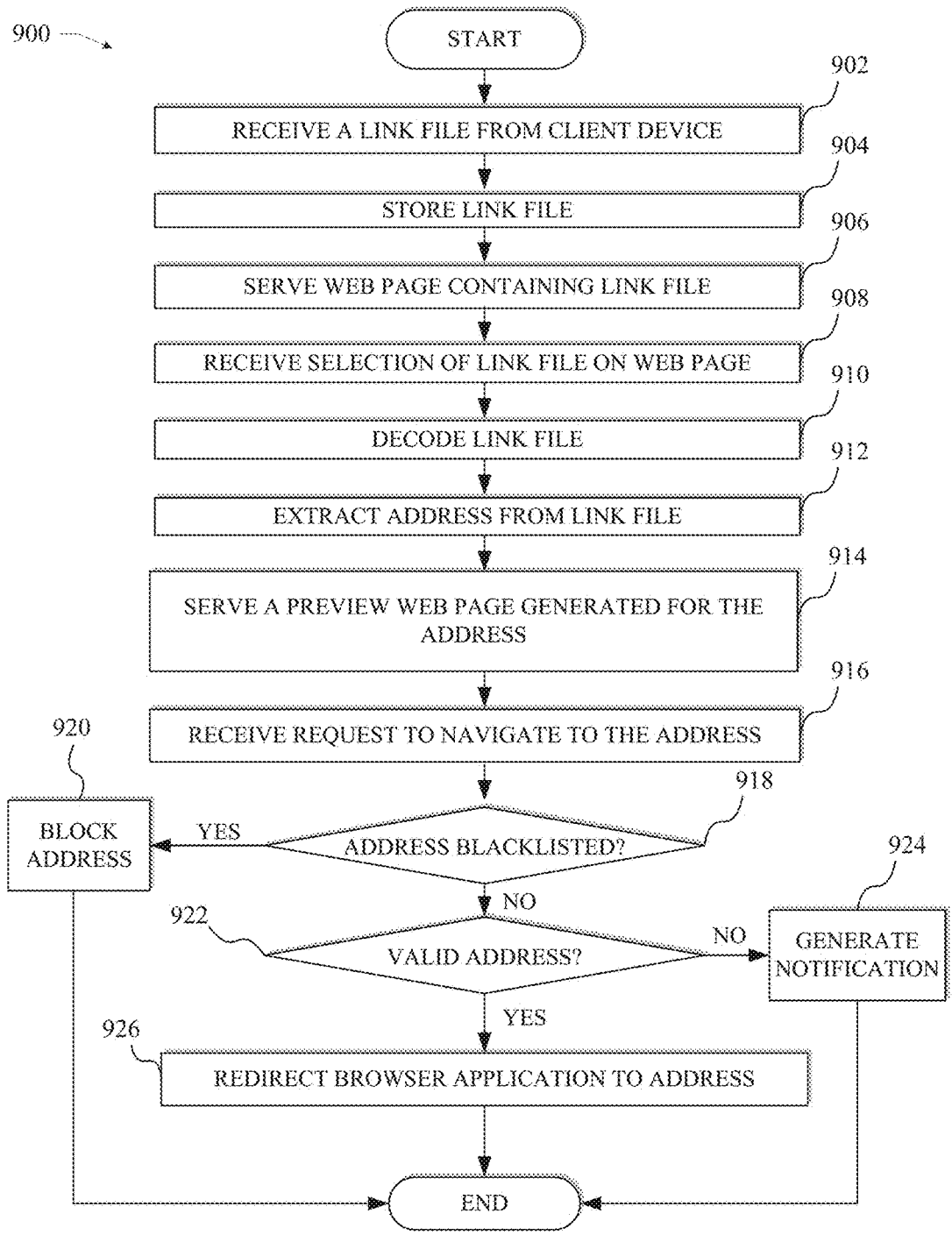
FIG. 9A shows a flowchart of an example method embodiment.

FIG. 9A shows a flowchart 900 of an example method embodiment. At step 902, content management system 106 can receive a link file from client device $102_1$. Client device $102_1$ can save or upload the link file to content management system 106 via browser application 210 or client application 206, as described above with reference to FIGS. 3A-C.

At step 904, content management system 106 can store the link file. Content management system 106 can store the link file on a specific folder or destination selected by the user when uploading or adding the link file to content management system 106. Moreover, the specific folder or destination can be associated with a particular user account. For example, the specific folder or destination can be within a root folder of a user account authenticated with content management system 106.

Further, content management system 106 can store the link file on a folder containing items for presentation on a website associated with content management system 106. For example, content management system 106 can store the link file in a folder of items provided on a web page or website hosted by web interface 202.

At step 906, content management system 106 can serve a web page containing the link file. Content management system 106 can serve the web page via web interface 202, as described above with reference to FIGS. 1 and 2. Moreover, content management system 106 can serve the web page to one or more client devices 102. Client devices 102 can access the web page via respective browser applications. For example, client devices 102 can respectively request and render the web page from respective browser applications. In some cases, client devices 102 must authenticate with a specific user account to access the web page. In other cases, client devices 102 can access the web page without authentication.

The web page can display the link file along with any other content maintained by content management system 106 for a specific user account and/or within a specific location, such as a folder (e.g., folder 320). For example, the web page can present the link file and any other files or folders contained within a folder maintained by content management system 106 for one or more user accounts. Users can thus upload links to be centrally stored on content management system 106 along with other user content items.

A user can access the web page from any network device, including the same device used to upload the link file to content management system and any other device. This way, users can access links uploaded to content management system 106 from any network device. Thus, users can maintain their links and other content items in a central location for access from any device.

At step 908, content management system 106 can receive a selection of the link file displayed on the web page from client device $102_1$. For example, content management system 106 can receive a selection of the link file from client application 206, as previously described with reference to FIGS. 3B, 3C, and 4.

At step 910, content management system 106 can decode the link file. Here, content management system 106 can parse the link file and identify a link or URL in the link file (e.g., field 804, key/string 824, etc.). Content management system 106 can decode and parse the link file based on the format of the link file (e.g., URL file, WEBSITE file, WEBLOC file, etc.).

At step 912, content management system 106 can extract the address referenced in the link file.

At step 914, content management system 106 can then serve a preview web page generated for the address to client device $102_1$. The preview web page can display the address extracted from the link file. For example, the preview web page can display the name and/or extension of the link file, the link extracted from the link file, the type of resource located at the address, address information or metadata, etc.

The preview web page can also display a graphical control element for submitting a request to navigate to the address. The graphical control element can be configured to allow a user to request the address be loaded on browser application 210 at the client device $102_1$. The graphical control element can also be configured to allow a user to select to load the address in a different tab or window on browser application 210.

In addition, the preview web page can include preview content associated with the address, as previously described. For example, the preview web page can include a thumbnail or icon representing content associated with the address.

At step 916, content management system 106 can receive a request from browser application 210 at client device $102_1$ to navigate to the address associated with the preview web page. For example, content management system 106 can receive a request via a graphical control element on the preview web page, which is configured to re-direct browser application 210 to the address or otherwise instruct browser application 210 to load the address.

At step 918, content management system 106 can determine if the address is blacklisted. For example, content management system 106 can include a list of addresses that have been blacklisted to prevent client devices 102 from navigating to those addresses from link files stored at content management system 106. The list of addresses can be defined for one or more users, or configured system-wide. The addresses in the list of blacklisted addresses can be selected based on security issues, parental controls, content restrictions, content filtering policies, permissions, browsing histories, user profiles, user preferences, threat levels, etc.

If the address is blacklisted, at step 920 content management system 106 can block the address or prevent the user to navigate to the address. In some cases, content management system 106 can provide a prompt or feature which allows the user to override a blacklist setting and continue to navigate to the address. Moreover, when restricting or blocking the user from navigating to an address, content management system 106 can display a notification to inform the user that the address is blacklisted. The notification can include a reason for the blacklisting and controls for requesting the address to be whitelisted or unrestricted.

At step 922, if the address is not blacklisted, content management system 106 can validate the address. Here, content management system 106 can check if the address is functioning properly. For example, content management system can fetch the address and determine if any errors occurred.

At step 924, if the address is not valid (e.g., link is broken or resource unavailable), content management system 106 can generate a notification to the user that the address is not valid. Content management system 106 can send the notification to client device $102_1$ for presentation at browser application 210. The notification can include an error and/or explanation for the error. Moreover, the notification can include an option to re-check the address or continue to navigate to the address.

At step 926, if the address is valid, content management system 106 can redirect browser application 210 to the address. For example, content management system 106 can run a script or send an instruction to browser application 210 configured to trigger browser application 210 to navigate to the address. Browser application 210 can then navigate to the address and open any resources or content located at the address. Browser application 210 can load the address in a new window or tab or a current window or tab depending on a configuration of browser application 210 and/or a preference submitted by the user via browser application 210.

Figure 9B:
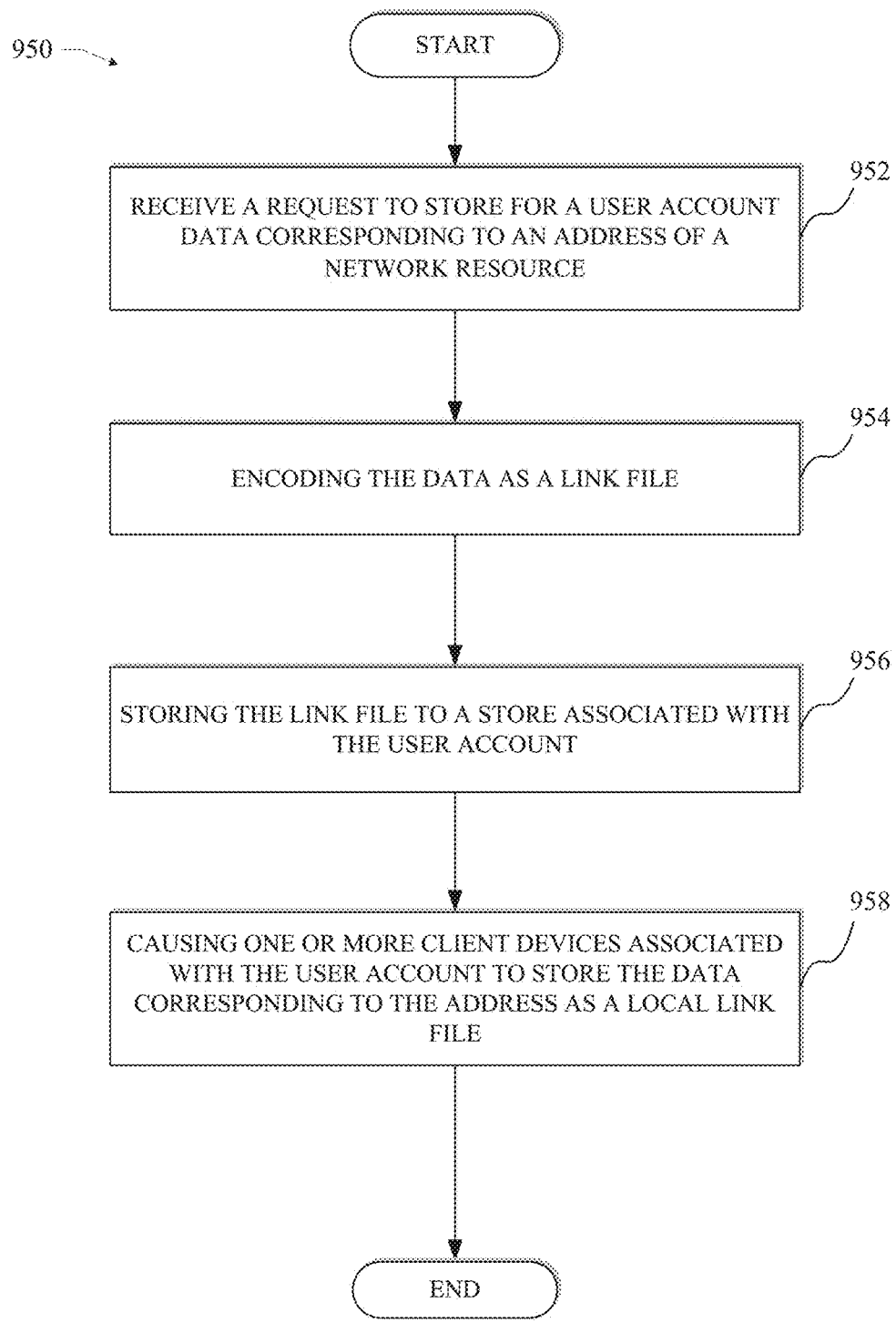
FIG. 9B shows a flowchart of another example method embodiment.

FIG. 9B shows a flowchart 950 of another example method embodiment. At step 952, content management system 106 can a request from client device $102_1$ to store for a user account data corresponding to an address of a network resource. The data can be, for example, a link or URL. Moreover, content management system 106 can receive the request from browser application 210 or client application 206.

At step 954, content management system 106 can encode the data as a link file. Content management system 106 can encode the data by converting the data into block data and generating a blocklist, formatting the data for storage, parsing the data, creating an instance of the data, storing the link file, etc. If the data is a duplicate link file, content management system 106 can encode the data or link file as a pointer to an existing copy.

The link file can include the address to the network resource. For example, the link file can include a URL or network address. Moreover, the link file can vary in format (e.g., URL file, WEBLOC file, WEBSITE file, etc.).

At step 956, content management system 106 can store the link file to a store associated with the user account. In some configurations, content management system 106 can store the link file as part of the encoding of step 954 or as a separate step. Moreover, content management system 106 can store the link file to a store on content management system 106 associated with the user account (e.g., folder 320).

At step 958, content management system 106 can cause one or more of client devices 102 to store the data corresponding to the address as a local link file. For example, content management system 106 can synchronize the data or link file to client device $102_1$. Client device $102_1$ can receive the data and/or link file and store the data or link file as a local link file on client device $102_1$. The local link file can include the address to the network resource. For example, the local link file can include a URL to the network resource.

In some cases, the format of the local link file can vary. For example, the local link file can be stored as a URL file, a WEBSITE file, a WEBLOC file, etc. Moreover, the format and extension of the local link file can vary based on the browser and/or OS at the specific client device.

The one or more client devices 102 storing the local link file can use the local link file to navigate to the address in the local link file. For example, the user can select the local link file from the user's device, which can prompt a browser application at the user's device to navigate to the address in the local link file.

Content management system 106 can validate the address in the link file and local link file prior to generating the link file or local link file, or in response to a user's request to access the link file. For example, content management system 106 can validate the address in the link file when a user selects the link file to navigate to the address in the link file.

Content management system 106 can also check if the address is blacklisted and prevent navigation to the address if it is determined to be in a blacklist. For example, content management system 106 can receive a request from a user to navigate to the address. In response to the request, content management system 106 can parse the link file, extract the address, and check if the address is blacklisted. If the address is not blacklisted, content management system 106 can re-direct the user's browser application to the address. Alternatively, if the address is blacklisted, content management system 106 can block the address and/or present a warning or prompt to the user to notify the user that the address is blacklisted. In some examples, the prompt or warning can include an option to allow the user to override any blocking of the address and navigate to the address.

Figure 10A:
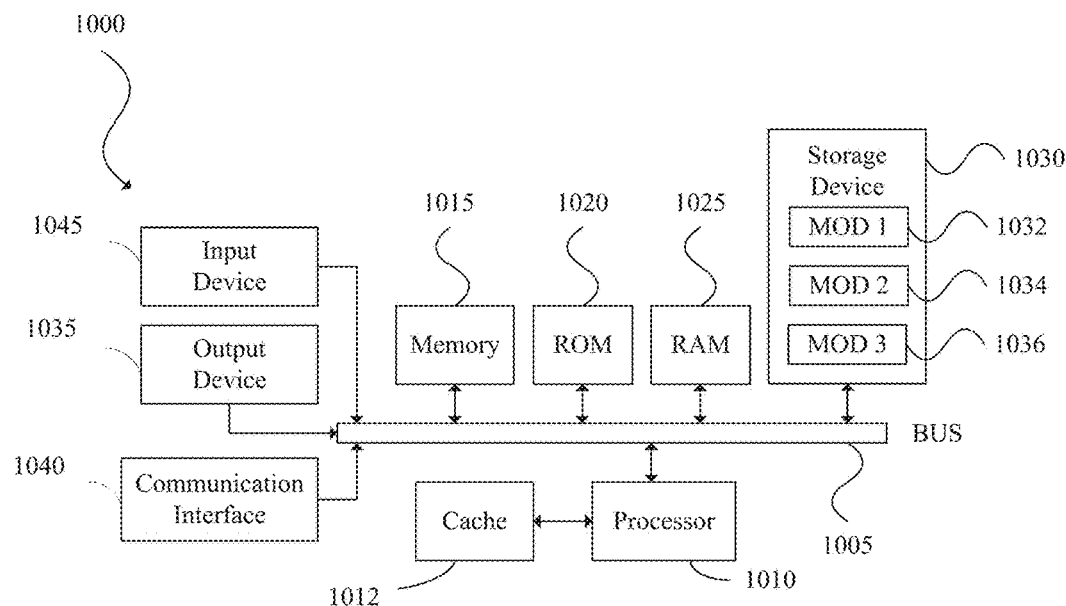
FIG. 10A shows a first exemplary system for implementing various embodiments of the present technology.
Figure 10B:
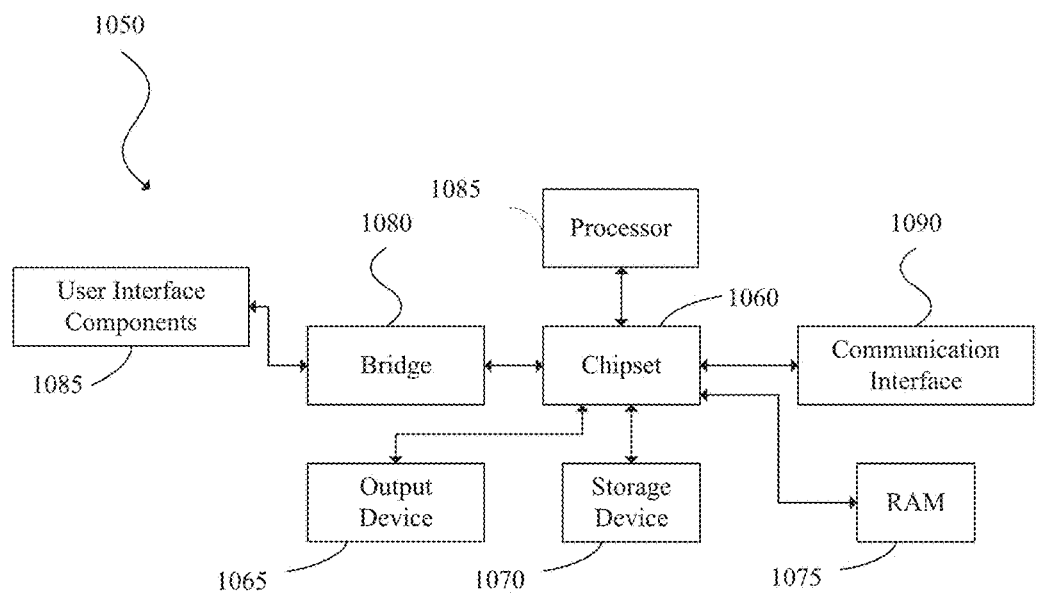
FIG. 10B shows a second exemplary system for implementing various embodiments of the present technology.

FIG. 10A and FIG. 10B show exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Moreover, claim language reciting "at least one of" a set indicates that one member of the set or multiple members of the set satisfy the claim. For example, claim language reciting "at least one of A and B" indicates that either a set of A or B (e.g., A only or B only) or a set of A and B (e.g., both A and B) can satisfy the claim.

What is claimed is:

1. A computer-implemented method comprising:
   receiving, by a content management system from a user account registered at the content management system, a request to store a link file comprising an address of a markup language network resource located outside of the content management system, the request to store the link file indicates a location at the content management system that is accessible to the user account in which to store the link file;
   in response to the request, generating the link file—wherein the link file, when selected or activated via an input from a client device, redirects the client device to the address and causes the client device to render a content of the markup language network resource from the address;
   storing, by the content management system, the link file to a cloud storage associated with the user account, wherein the link file is stored in a collection including the link file and at least one type of content item that is not the link file;
   synchronizing, by the content management system, one or more client devices associated with the user account to store a local version of the link file in a local version of the collection including the at least one type of content item that is not the link file;
   in response to a user selection of the link file, generating a preview of the content of the network resource associated with the address;
   causing the preview of the content of the network resource to be displayed on the client device; and
   in response to user input associated with the preview of the content of the network resource performing the redirection of the client device to the address.

2. The computer-implemented method of claim 1, wherein the preview of the content includes at least one of a thumbnail image, a portable document format (PDF), and an indication of the address associated with the network resource.

3. The computer-implemented method of claim 1, wherein the link file, when selected or activated via the input from the client device, causes the client device to render the content of the network resource by extracting the address from the link file, redirecting the client device to the address from the link file, and loading the content of the network resource from the address.

4. The computer-implemented method of claim 1, further comprising:
   determining the address is valid, wherein determining that the address is valid includes:
   determining that there is a connectable server associated with the address.

5. The computer-implemented method of claim 1, further comprising:
   determining the address is not blacklisted, wherein determining that the address is not blacklisted includes:
   determining the address does not correspond to a blacklisted address.

6. The computer-implemented method of claim 1, wherein causing the one or more client devices associated with the user account to store the local version of the link file comprises:
   determining at least one of a browser application or an operating system of at least one of the one or more client devices; and encoding the local link file in a file format and an associated extension based on at least one of the browser application or the operating system.

7. The computer-implemented method of claim 1, further comprising:
receiving a second request for the local version of the link file from at least one of the one or more client devices; and
causing a browser application of the at least one of the one or more client devices to navigate to the address.

8. The computer-implemented method of claim 1, wherein the request is received from the client device by a drag-and-drop or paste operation.

9. The computer-implemented method of claim 1, wherein the address comprises a URL, and wherein encoding the address as the link file includes:
generating at least one of a URL file, a WEBLOC file, or a WEBPAGE file including the address.

10. The computer-implemented method of claim 1, wherein encoding the address as the link file includes:
encoding a data file corresponding to the address as one or more blocks; and
generating a blocklist for the one or more blocks.

11. The computer-implemented method of claim 1, wherein the request to store the address of the network resource in association with the user account comprises a respective request to store a plurality of addresses of a plurality of network resources, the method further comprising generating a plurality of link files comprising the plurality of addresses encoded as the plurality of link files, wherein each respective address from the plurality of addresses is stored in a separate link file from the plurality of link files, and wherein each separate link file, when selected or activated via a respective input from the client device, redirects the client device to the respective address and causes the client device to render a respective content of an associated network resource from the respective address.

12. A non-transitory computer-readable medium storing instructions that, upon being executed by one or more processors, cause the one or more processors to:
receive, by a content management system from a user account registered at the content management system, a request to store a link file for the user account comprising an address of a markup language network resource located outside of the content management system, the request to store the link file indicates a location at the content management system that is accessible to the user account in which to store the link file;
in response to the request, generate the link file, wherein the link file, when selected or activated via an input from a client device, redirects the client device to the address and causes the client device to render a content of the markup language network resource from the address;
store, by the content management system, the link file to a cloud storage associated with the user account, wherein the link file is stored in a collection including the link file and at least one type of content item that is not the link file;
synchronize, by the content management system, one or more client devices associated with the user account to store a local version of the link file in a local version of the collection including the at least one type of content item that is not the link file;
in response to a user selection of the link file, generate a preview of the content of the network resource associated with the address;
cause the preview of the content of the network resource to be displayed on the client device; and
in response to user input associated with the preview of the content of the network resource perform the redirection of the client device to the address.

13. The non-transitory computer-readable medium of claim 12, wherein the preview of the content includes at least one of a thumbnail image, a portable document format (PDF), and an indication of the address.

14. The non-transitory computer-readable medium of claim 12, storing additional instructions which, when executed by the one or more processors, cause the one or more processors to:
receive a second request to access the local version of the link file from at least one of the one or more client devices; and
cause a browser application of the at least one of the one or more client devices to navigate to the address.

15. A content management system, comprising:
one or more processors; and
memory including instructions that, upon being executed by the one or more processors, cause the content management system to:
receiving, from a client device, an address to a markup language network resource;
generate a link file, wherein the link file, when selected or activated via an input from the client device, redirects the client device to the address and causes the client device to render a content of the markup language network resource from the address;
provide, to one or more client devices, the link file on a first page of a website associated with the content management system;
in response to the link file being selected or activated via a respective input received from a browser application associated with at least one of the one or more client devices:
in response to a user selection of the link file, generate a preview of the content of the network resource associated with the address;
cause the preview of the content of the network resource to be displayed on the client device;
extract the address from the link file;
provide a second page on the website, the second page displaying the address from the link file and a graphical element configured to receive a request from the browser application to navigate to the address; and
in response to receiving the request from the browser application, instruct the browser application to navigate to the address.

16. The content management system of claim 15, wherein the address comprises a link to a web page, and wherein instructing the browser application to navigate to the address comprises re-directing the browser application to the address to open the web page.

17. The content management system of claim 15, wherein a format and extension of the link file is based on at least one of the browser application or an operating system of the client device.

18. The content management system of claim 15, wherein extracting the address and providing the second page comprises:

parsing the link file;
identifying a format of the link file;
decoding the link file;
fetching the address; and
validating the address.

\* \* \* \* \*